US011842305B1

(12) United States Patent
Ho

(10) Patent No.: US 11,842,305 B1
(45) Date of Patent: Dec. 12, 2023

(54) METHOD AND APPARATUS FOR ROUTE SCHEDULING

(71) Applicant: Waye, LLC, Woodinville, WA (US)

(72) Inventor: William P. C. Ho, Woodinville, WA (US)

(73) Assignee: Waye, LLC, Woodinville, WA (US)

( * ) Notice: Subject to any disclaimer, the term of this patent is extended or adjusted under 35 U.S.C. 154(b) by 0 days.

(21) Appl. No.: 17/946,653

(22) Filed: Sep. 16, 2022

(51) Int. Cl.
*G06Q 10/00* (2023.01)
*G06Q 10/0631* (2023.01)
*G01C 21/34* (2006.01)
*G06Q 50/30* (2012.01)

(52) U.S. Cl.
CPC . *G06Q 10/063112* (2013.01); *G01C 21/3484* (2013.01); *G06Q 50/30* (2013.01)

(58) Field of Classification Search
CPC .......... G06Q 50/30; G06Q 10/063112
See application file for complete search history.

(56) References Cited

U.S. PATENT DOCUMENTS

| | | | |
|---|---|---|---|
| 6,754,634 B1 | 6/2004 | Ho | |
| 7,127,411 B2 | 10/2006 | Ho | |
| 7,668,727 B2 | 2/2010 | Mitchell et al. | |
| 7,672,855 B2 | 3/2010 | Peterkofsky et al. | |
| 8,438,118 B2 | 5/2013 | Ho | |
| 8,504,485 B1 * | 8/2013 | Wenneman | G06Q 10/083 705/338 |
| 8,554,467 B2 | 10/2013 | Ho | |
| 10,094,676 B1 | 10/2018 | Ho | |
| 10,634,502 B2 | 4/2020 | Ho | |
| 10,955,246 B2 | 3/2021 | Ho | |
| 2005/0165629 A1 | 7/2005 | Bruns | |
| 2005/0246192 A1 | 11/2005 | Jauffred et al. | |
| 2006/0224423 A1 | 10/2006 | Sun et al. | |
| 2006/0265234 A1 | 11/2006 | Peterkofsky et al. | |
| 2008/0306795 A1 | 12/2008 | Ho | |

(Continued)

FOREIGN PATENT DOCUMENTS

WO 2019136472 A1 7/2019

OTHER PUBLICATIONS

H. Luo, Z. Bao, F. M. Choudhury and J. S. Culpepper, "Dynamic Ridesharing in Peak Travel Periods," in IEEE Transactions on Knowledge and Data Engineering, vol. 33, No. 7, pp. 2888-2902, Jul. 1, 2021, doi: 10.1109/TKDE.2019.2961341. (Year: 2019).*

(Continued)

*Primary Examiner* — Matheus Ribeiro Stivaletti
(74) *Attorney, Agent, or Firm* — Perkins Coie LLP

(57) ABSTRACT

A system and method for assigning trip requests to schedules for a fleet of one or more available vehicles in a manner that allows for the comparison of the various possible schedules against a number of global factors. Trip requests are combined into packets and one or more packets that can serve as a root packet or a first packet to be serviced by a partial shift are determined. Schedules are determined for each of the one or more possible root packets. The schedules are ranked according to one or more global factors to select a schedule for the partial shift. By generating combinations of packets that can be assigned to partial shifts, the problem of combinatorial explosion is reduced such that alternative schedules can be compared against one or more quality metrics for the schedule.

10 Claims, 4 Drawing Sheets

| Trip ID | Pick/Drop | A / W | Slack (OTP) | Arrival | ETA | [Window] | Next Time | Next Miles |
|---|---|---|---|---|---|---|---|---|
| 64w | pick | 0 / 1 | 30 | 15:00 | 15:00 | [15:00-15:30] | 10 mins. | 1.4 mi. |
| 883 | pick | 1 / 1 | 13 | 15:17 | 15:17 | [15:00-15:30] | 1 mins. | 0.6 mi. |
| 2169 | pick | 2 / 1 | 9 | 15:22 | 15:22 | [14:51-15:31] | 19 mins. | 3 mi. |
| 2169 | drop | 1 / 1 | 9 | 15:51 | 15:51 | [15:30-16:00] | 19 mins. | 2.8 mi. |
| 64w | drop | 1 / 0 | 55 | 16:15 | 16:15 | [16:04-17:10] | 3 mins. | 0.6 mi. |
| 883 | drop | 0 / 0 | 49 | 16:21 | 16:21 | [15:55-17:10] | 0 mins. | 0 mi. |

(56) References Cited

U.S. PATENT DOCUMENTS

| | | |
|---|---|---|
| 2011/0022535 A1 | 1/2011 | Ho |
| 2011/0184774 A1* | 7/2011 | Forstall .................. G06Q 50/30 |
| | | 705/7.25 |
| 2013/0166188 A1* | 6/2013 | Zheng .................. G08G 1/0133 |
| | | 701/117 |
| 2016/0231127 A1 | 8/2016 | Wechsler |
| 2016/0364823 A1 | 12/2016 | Cao |
| 2017/0031926 A1 | 2/2017 | Katircioglu et al. |
| 2019/0026671 A1* | 1/2019 | Al Falasi ............ G01C 21/3438 |
| 2019/0212149 A1* | 7/2019 | Ho ..................... G01C 21/3453 |
| 2022/0027818 A1* | 1/2022 | Jin .................. G06Q 10/06314 |
| 2022/0108615 A1* | 4/2022 | Li ........................... G06N 3/044 |
| 2023/0039788 A1* | 2/2023 | Oshiro ................. B65G 1/1371 |

OTHER PUBLICATIONS

Charikar, Moses, Samie Khuller, and Balaji Raghavachari. "Algorithms for Capacitated Vehicle Routing." SIAM Journal on Computing 31.3 (2001): 665-682. Hoover's Company Profiles; ProQuest Central. Web.

ISA, International Search Report and Written Opinion, PCT Patent Application PCT/US2019/012760, dated Apr. 12, 2019, 6 pages.

* cited by examiner

| Trip ID | Pick/Drop | A/W | Slack (OTP) | Arrival | ETA | [Window] | Next Time | Next Miles |
|---|---|---|---|---|---|---|---|---|
| 64w | pick | 0/1 | 30 | 15:00 | 15:00 | [15:00-15:30] | 10 mins. | 1.4 mi. |
| 883 | pick | 1/1 | 13 | 15:17 | 15:17 | [15:00-15:30] | 1 mins. | 0.6 mi. |
| 2169 | pick | 2/1 | 9 | 15:22 | 15:22 | [14:51-15:31] | 19 mins. | 3 mi. |
| 2169 | drop | 1/1 | 9 | 15:51 | 15:51 | [15:30-16:00] | 19 mins. | 2.8 mi. |
| 64w | drop | 1/0 | 55 | 16:15 | 16:15 | [16:04-17:10] | 3 mins. | 0.6 mi. |
| 883 | drop | 0/0 | 49 | 16:21 | 16:21 | [15:55-17:10] | 0 mins. | 0 mi. |

*FIG. 1*

|  | Packet | | | | | | |
|---|---|---|---|---|---|---|---|
| Half-Shift Route | 1 | 2 | 3 | 4 | 5 | 6 | ... |
| 1 | 1 | 0 | 1 | 0 | 1 | 0 | |
| 2 | 0 | 0 | 0 | 0 | 0 | 0 | |
| 3 | 1 | 0 | 1 | 0 | 0 | 1 | |
| 4 | 1 | 1 | 0 | 0 | 0 | 0 | |
| 5 | 0 | 1 | 1 | 1 | 0 | 0 | |
| 6 | 1 | 0 | 1 | 0 | 0 | 0 | |

*FIG. 4*

| Route | Possible root packets |
|---|---|
| route$_1$ | [P$_1$, P$_6$, P$_{26}$, P$_{124}$] |
| route$_2$ | [P$_1$, P$_{21}$, P$_{38}$, P$_{240}$] |
| route$_3$ | [P$_4$, P$_{12}$, P$_{33}$, P$_{126}$] |

*FIG. 5*

METHOD AND APPARATUS FOR ROUTE SCHEDULING

TECHNICAL FIELD

The disclosed technology relates to systems and methods for scheduling a number of user requested trips onto a fleet of available vehicles.

BACKGROUND

Para-transit service is an on-demand service mandated by the Americans with Disabilities Act (ADA) that was passed into law on Jul. 26, 1990. The ADA provides a subsidized. 0-denial, door-to-door service to the elderly and handicapped for daily mobility. Qualified and registered clients typically call in trip requests up to 7 days in advance, for anywhere to anywhere in a service area. The requests are either Pick-anchored ("I want to be picked up at 10:00 AM") or Drop-anchored ("My Doctor's appointment is at 10:30 AM"). Each client is given a promised pick time window of 30 minutes [Pick-time, Pick-time+30 minutes]. For appointments, an additional requirement is that the client must be dropped off at the appointment address in a time window of 30 minutes [Appointment-time—30 minutes, Appointment-time]. There may be variations in this model. For example, clients may be limited to call in trip requests up to 3 days in advance.

The day before the day of service, all of the requested trips are batch optimized onto a mixed service fleet of vans and sedans, each of which is equipped with a fixed number of wheelchair and ambulatory seats. A fleet is typically composed of one to multiple providers called Dedicated Service Providers (DSPs) in that their vehicles and drivers are fully committed to, and fully scheduled by, the para-transit operation. The challenge is to solve a brand-new optimization problem every day within a multitude of scheduling constraints that can include such factors as:

The number and type of vehicles available;
The shift structure of the vehicle fleet;
The pick up within the 30 minute promised pick window;
The drop off within the 30 minute appointment window;
The vehicles' seating capacities;
The client's load time & unload time;
The estimated travel times between stops (based on time of day and day of week);
The client's maximum onboard ride time (based on the equivalent ride time on a fixed-route bus) etc.

The following is a brief description of two known methods of assigning trip requests to vehicle routes.

Prior Art—Greedy Algorithm

A greedy algorithm is a constructive method that builds a schedule one route at a time by selecting the best option available at the moment. It doesn't worry whether the current selection will bring the globally optimal result. The greedy algorithm selects a route to schedule, builds it in a greedy manner, selects a second route to schedule, builds it in a greedy manner, and so on. For instance, for the route under construction, a greedy scheduler would select as the $1^{st}$ trip, the one with the pick address closest to a garage, earliest promised pick time window, and longest travel distance. Then, the greedy scheduler might select as the $2^{nd}$ trip, the one with its pick address closest to the drop address of the $1^{st}$ trip, earliest promised pick time window, and longest travel distance and so on. This method does not take into consideration the consequences of a pick on any other route.

Prior Art—Pocketing & Chaining

Another method of assigning trips to vehicle routes involves pocketing and chaining trip requests together as described in U.S. Pat. Nos. 10,634,502 and 10,955,246, which are herein incorporated by reference in their entirety. In this method, groups of trip requests are combined into packets. Each packet is a mini-manifest that meets all of the para-transit scheduling constraints. Packets are assigned onto a vehicle fleet constructively, with each decision based on some type of heuristic cycle, such as;
1. Pick the "best" unscheduled packet to schedule into the vehicle fleet;
2. Pick the "best" vehicle route that can service that packet;
3. Commit the "best" packet to the "best" vehicle route;
4. Update the state of a scheduling model;
5. Go to Step 1. for the next heuristic cycle.

The picketing and chaining method concludes when there are no unscheduled packets left or there are no available spaces in any vehicle shift to schedule unscheduled packets onto. The trips in unscheduled packets are put onto a waitlist going into the day of service. The vehicle fleet can be edited (extending vehicle shifts or adding more vehicle shifts) and the method can be re-applied to reduce the waitlist to a manageable number, as deemed by the operational staff. Another option is to send qualified waitlisted trips to alternative, backup service providers, such as taxis, brokers, or TNC's (e.g. Lyft® or Uber®). These providers are designated as non-dedicated service providers (NDSPs).

On the day of service, there are typically 20-30% cancelations that create gaps in the schedule. Most cancelation requests occur in the early part of the day of service. As cancelations accumulate, the dispatcher staff can try to insert remaining waitlisted trips into the gaps that are created.

The heuristic method of sequentially assigning packets to a vehicle in a fleet is a constructive method of building a schedule. Any of a number of unscheduled packets may potentially be selected as the "best" unscheduled packet to be scheduled. All vehicle routes that qualify may potentially be selected as the "best" vehicle for the "best" unscheduled packet to be placed on. As such, characteristics of any/all vehicles are not knowable until the end of the method, when the last packet has been scheduled onto some vehicle route. For example, the final size and position of unused gaps in any/all vehicles is not knowable until the end of the method. The balance of work, or the evenness of the number of packets that are placed on each vehicle's route, is not knowable until the end of the method. It is also a passive consequence of the constructive process.

One problem with these and other methods of scheduling various trip requests is that there is no practical way to determine if any particular assignment of trips requests to available vehicles is better than any other. The definition of what is "better" or "best" may vary but can include such quality factors as: minimizing dead head time when vehicles are travelling without passengers; minimizing driver wait time at stops; maximizing the number of completed trips per hour etc. In typical urban locations, where it is not uncommon to have 5000+ trip requests that need to be scheduled every day, it is nearly impossible to compute an "optimal" or "best" assignment of requested trips to available vehicles in a reasonable time limit with conventional computing equipment. Given this problem, there is a need for a system that can assign trip requests to vehicle routes in a manner that allows for the comparison of possible route solutions against one or more quality metrics in a manner that can be completed in a reasonable time.

SUMMARY

As will be discussed in further detail below, the disclosed technology is a method and apparatus for assigning packets of trip requests onto schedules of available vehicles in a vehicle fleet. The disclosed technology allows a large number of possible solutions to be compared prior to committing packets to routes in order to select solutions that better meet one or more quality metrics.

In any cycle, all unscheduled packets are candidates and all vehicle routes are also candidates for the associated incremental constructive step. The disclosed method schedules a knowable subset of packets onto a subset of 1 to N vehicle routes for partial shifts. In one embodiment, the partial shifts are half-shifts but other divisions could be use e.g. third-shifts etc. Quality factors such as the number and position of unused gaps, the balance of work, and the amount of deadhead travel times and deadhead travel miles become considerations and part of the decision-making process in deciding which packets are scheduled onto which vehicle routes. The disclosed method is a heuristic selection process atop a deterministic constructive process followed by a second heuristic selection process, as opposed to a single pass constructive process. In one embodiment, trip requests are scheduled by:
1. Picking a "best" subset of all available half-shifts to schedule next;
2. Identifying a set of trip packets that can be scheduled onto that subset of half-shifts;
3. Identifying a subset of those trip packets that can serve as starting points for the subset of half-shifts;
4. Generating all candidate schedules for the "best" subset of half-shifts
5. Pick and commit candidate schedules to half-shifts by
   a. Picking the "best" haft-shift to commit to next
   b. Picking the "best" schedule to assign to that half-shift
   c. Committing the "best" schedule to the "best" half-shift
   d. Eliminating candidate schedules that share a packet with the selected "best" schedule
   e. Performing steps 5a-5e for the next heuristic sub-cycle
6. Going to Step 1. for the next subset of available half-shifts and repeating the sequence until all trips are scheduled or put on a waitlist or sent to NDSP's.

BRIEF DESCRIPTION OF THE DRAWINGS

FIG. 1 shows data for a number of trip requests to be scheduled that are stored in a memory;

FIG. 4 illustrates a partial data structure, such as a matrix, that stores a record of which packets can be served by which routes (packet to route compatibility) in accordance with one embodiment of the disclosed technology;

FIG. 5 illustrates a number of partial shifts and possible root packets that are used in determining possible route solutions in accordance with an embodiment of the disclosed technology.

DETAILED DESCRIPTION

Vehicle Routes and Partial-Shifts

FIG. 1 illustrates data for a number of trip requests that are to be scheduled onto vehicles in a vehicle fleet. The data for the trip requests are stored in a memory of a computer from information that is entered by clients and received over the Internet or entered by operators at a call center that receives ride requests from clients. In one implementation, data stored for each trip request includes an alphanumeric identifier, an indication of whether the trip is dictated by either a pick up at a certain time or a drop off at a certain time (pick/drop), data indicating if the rider is ambulatory or in a wheel chair, the pickup time window, the drop off time window, the location (longitude, latitude) of the pick address, the location (longitude, latitude) of the drop address, and other data that are stored in memory to help schedule the trip.

As will be detailed below, rather than trying to determine the best vehicle routes needed to service all the trip requests, the disclosed technology assigns trips (actually packets or groups of trip requests) onto partial route schedules. In one embodiment, the partial schedule is two half-shifts for a vehicle route. In one implementation, each vehicle route has an associated shift that is defined by a shift start time to depart from a garage, a shift end time to return to the garage and a driver break that is typically in the middle of the shift. For example, one vehicle may be assigned a shift starting at 8:00 and ending at 17:00, with a driver break from 12:00 to 13:00 wherever the vehicle happens to be located at that time. As such, each route consists of 2 half-shifts, which are designated half-shift-A and half-shift-B. For such a vehicle, half-shift-A is from 8:00 to 12:00 starting from the garage to whatever address the last packet in half-shift-A leaves it. Half-shift-B is from 13:00 to 17:00 starting from whatever address the last packet in half-shift-A leaves it and ending back at the garage. Each half-shift is typically 4 hours in duration.

Figures 2, 3:
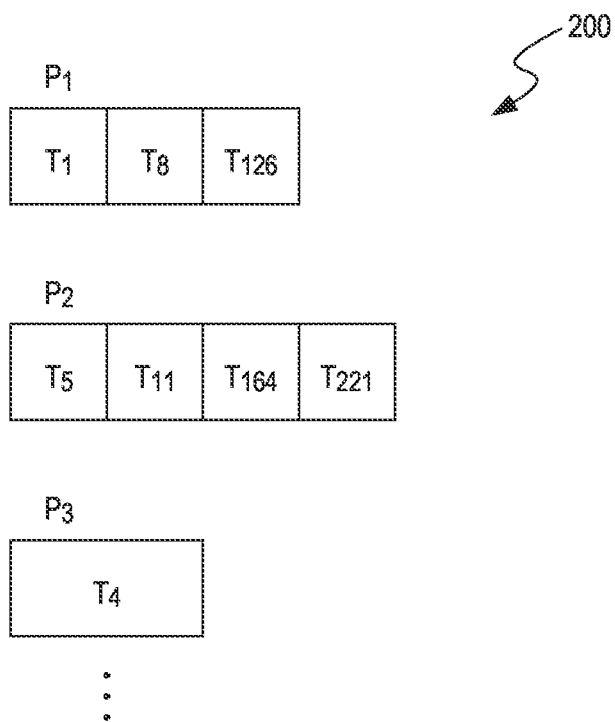
FIG. 2 illustrates a number of packets in which trip requests that meet ride criteria are grouped together.
FIG. 3 illustrates a partial data structure, such as a matrix, that stores a record of packets that can be linked together to form a schedule (packet to packet compatibility) in accordance with one embodiment of the disclosed technology.

FIG. 2 illustrates a number of packets defining groups of one or more trip requests that can be serviced by a single vehicle according to a number of ride criteria. As shown, a packet P1 includes three trip requests T1, T8 and T126. Packet P2 includes four trip requests T5, T11, T164 and T221. Finally, packet P3 includes a single trip request 14. One implementation of how trip requests are grouped into packets is disclosed in the U.S. Pat. Nos. 10,634,502 and 10,955,246 as referenced above. As an example of real trip request data for a representative weekday at a para-transit site in a city in the Northeastern U.S., there were 6063 trips requested for the day of service with 601 vehicle routes available (sedans with 3 ambulatory seat and vans with 4 ambulatory seats+2 wheelchair seats). A scheduling engine based on the above-referenced packeting method transforms the 6063 trip request set into 2392 packets, a reduction to 39.5% of the original number of trip requests. Packets ranged in size from 7 trip requests to 1 trip request each. The average packet had 2.5 trip requests, with a 52 minute span. The average connective deadhead travel miles was 7.9 miles per packet, which at a speed of 15 miles per hour translates to 32 minutes of deadhead travel time. So each average packet consumed (52+32)=84 minutes of time. With these packets, the average four hour half-shift will service approximately 3 Packets (240 minutes/84 minutes). This is important for the disclosed technology to be able to compare many possible route solutions in the face of combinatorial explosion.

Examples of Combinatorial Explosion

Determining how to link packets of trip requests together to create a route can quickly produce an unmanageable set of possible solutions due to combinatorial explosion. The set of possible outcomes (or Leaves) of a N-depth tree quickly explodes with the depth N. Consider a binary tree with branching factor of 2, where each parent node has 2 child nodes. The number of leaves per depth N is $2^{(N-1)}$. For depth N=6, the number of leaves is 32 Leaves, while for depth N=12, the number of leaves is 2,048. Consider a ternary tree with branching factor of 3, where each parent node has 3 child nodes. The number of leaves per depth N is $3^{(N-1)}$. For depth N=6, the number of leaves is 243, while for depth N=12, the number of leaves is 177,147. Consider a quad tree with branching factor of 4, where each parent node has 4 child nodes. The number of leaves per depth N is $4^{(N-1)}$. For depth N=6, the number of leaves is 1024 leaves, while for depth N=12, the number of leaves is 4,194,304. In the paratransit scheduling problem, where trip requests can theoretically link to many other trip requests, the number of possible routes that need to be investigated becomes exponentially large such that it is not possible to compare all the various possibilities in the time available to schedule the trips for the following day's routes. The disclosed technology is able to avoid the problem of combinatorial explosion by scheduling packets onto partial shifts thereby limiting the depth of the route decision tree. In this manner, large numbers of possible routes can be quickly compared against one another in order to select a "best" route according to one or more quality metrics.

Packeting reduces the number of objects to schedule. Because the average number of packets that can be serviced by a half-shift is approximately 3 to 4, the generation of all possible schedules for that half-shift is combinatorially feasible. 4 packets per half-shift represent an average of 8 to 10 trips, Generating all possible schedules for a route decision tree of trips of depth 10 is combinatorially explosive versus an average depth of 4, and may be infeasible, depending on the branching factor. Packeting further enables the disclosed method to be computationally practical. With picketing, the both the depth and the branching factor for packets is smaller than the depth and branching factor for trips, just by the number of items (packets versus trips) to consider.

Disclosed Techniques—Data Structures

Packet Can Link to Another Packet Data Structure

A scheduling engine based on the disclosed technology defines a data structure that stores a record of which packets can be linked to one another to form a vehicle schedule (e.g. packet-to-packet compatibility). As shown in FIG. 3, one embodiment of the record is a matrix 300 where a cell in the matrix [Packet F, Packet T] has value 1 if Packet T can link behind Packet F, and value of 0 (or no value) if Packet T cannot link behind Packet F because one or more of the following representative constraints is violated:

The deadhead miles from the last stop of Packet F to the $1^{st}$ stop of Packet T must be less than a maximum value MAX_DEADHEAD_MILES (a site parameter to prevent too-long deadhead miles—while technically legal, this is wasteful scheduling).

The arrival time from the last stop of Packet F is must be earlier than the end of the promised pick time window of the $1^{st}$ stop of Packet T (or the promised pick time window is violated).

If the arrival time from the last drop stop of Packet F is before the start of the promised pick time window of the $1^{st}$ stop of Packet T, then the wait time is calculated as (start of the promised pick time window—arrival time). The wait time must be less than a maximum value MAX_WAIT_MINUTES (a site parameter to prevent waiting unproductively too long before being able to pick up the client in the promised pick time window—while technically legal, this is wasteful scheduling).

If the arrival time from the last drop stop of Packet F is within the start of the promised pick time window of the $1^{st}$ stop of Packet T, then the OTP-protection time is calculated as (end of the promised pick time window—arrival time). The OTP-protection time must be greater than a minimum value MIN_OTP_MINUTES (a site parameter to enforce a safety time buffer against OTP violation on the day of service). OTP is an abbreviation for on-time performance, or picking up the client within the promised pick time window, Violating OTP can lead to client complaints and possible liquidated damages against the provider.

In one embodiment, the following representative industry values for these constraints are used in the examples. Of course, these can be personalized to site-specific values:

MAX_DEADHEAD_MILES 8.0 miles
MAX_WAIT_MINUTES 20 minutes
MIN_OTP_MINUTES 5 minutes All of the site parameters can be turned off, or set to a site-specific value based on its trip demand, vehicle mix capacities, shift structure, site traffic conditions, and so on.

In another actual example for a para-transit site in a city in the Northeast U.S. with 2392 packets, turning off MAX_DEADHEAD_MILES and MAX_WAIT_ MINUTES and MIN_OTP_MINUTES creates the most populated packet-can-link-to-packet matrix 300. The average number of packets that each packet can link to was 614.7. By turning on the constraints of MAX_DEADHEAD_ MILES=8.0 miles and MAX_WAIT_MINUTES=20 minutes and MIN_OTP_MINUTES=5 minutes, the average number of packets that each packet can link to was reduced to 23.8 thereby simplifying the number of possible route solutions.

For a para-transit site in the Southeast U.S. with 365 packets, turning off MAX_DEADHEAD_MILES and MAX_WAIT_MINUTES and MIN_OTP_MINUTES constraints created the most populated packet-can-link-to-packet matrix 300, where the average number of packets that each packet can link to was 99.5. Turning on MAX_DEADHEAD_MILES=8.0 miles and MAX_WAIT_ MINUTES=20 minutes and MIN_OTP_MINUTES=5 minutes constraints reduced the average number of packets that each packet can link to a manageable 19.9.

With the disclosed technology, the number of trips at a site is not as important to the combinatorial possibilities as the real-world service constraints. When applied, these constraints even out the size of subproblems (scheduling a vehicle route). A larger site will just have more subproblems (more vehicle routes) to solve.

Partial Shift can Serve a Packet Data Structure

A scheduling engine based on one embodiment of the disclosed technology also defines a data structure that stores a record of which packets can be serviced by which partial shifts. As shown in FIG. 4, a data structure, such a matrix 400, stores a record whereby a cell in the matrix for [Packet X, Half-Shift-Y] has value 1 if Packet X can be serviced by Half-Shift-Y, and value 0 (or no value) if Packet X cannot be serviced by Half-Shift-Y because one or more of the following representative constraints is violated:

The arrival time from the garage of Half-Shift-Y to the $1^{st}$ Stop of Packet X must be earlier than the end of the promised pick time window of the $1^{st}$ stop of Packet X (or the promised pick time window is violated).

If the arrival time from the garage is within the start of the promised pick time window of the $1^{st}$ stop of Packet X, then the OTP-protection time is calculated as (end of the promised pick time window—arrival time). The OTP-protection time must be greater than a minimum value MIN_OTP_MINUTES (a site parameter to enforce a safety time buffer against OTP violation on the day of service).

If Half-Shift-Y is the $1^{st}$ 4-hour half of a shift, the time window of the last stop of Packet X must be earlier than the end of the Half-Shift-Y.

If Half-Shift-Y is the $2^{nd}$ 4-hour half of a shift, the arrival time from the last stop of Packet X back to the garage of Half-Shift-Y must be earlier than the end of the Half-Shift-Y.

For a para-transit site in the Northeast U.S. with 2392 packets, before any packets are scheduled, the count of packets that each vehicle route can serve in a half-shift ranged from 84 to 791 with an average of 450.0 packets. For this para-transit site, there are 3 garages.

Adding an additional constraint will greatly reduce the count of packets that each vehicle route can serve, and consequently what its 2 half-shifts can serve. If a Garage X is located in the northwest corner of a service area, vehicle routes from Garage X should not be pulled so far away to serve packets in the southeast corner of the service area, since there are vehicle routes from the other two closer garages. One way to enforce this constraint is to identify the farthest garage from the $1^{st}$ stop of a Packet Y, and mark both corresponding cells of all vehicle routes that leave from or return to that farthest Garage (i.e. [Packet Y, Half-Shift-A] and [Packet Y, Half-Shift-B]) with value 0.

Root Packets for Partial Shifts

After the packet to packet compatibility matrix 300 and packet to route compatibility matrix 400 have been reduced by application of the desired routing rules, the scheduling engine then selects a subset of partial shifts to schedule. Which partial shifts to schedule can be determined by some practical heuristic selection criteria such as:

Pick half-shifts that have the same vehicle type (seating capacity) with the same shift start. Then the generation of candidate schedules for the N half-shifts only need to be done for 1 representative half-shift.

Schedule forward in time, starting with early morning haft-shifts. Practically, the branching factor for early morning half-shifts is significantly lower since packets are sparser before the morning rush hour.

Focus on rush hour periods first, by starting with Half-Shift-A's that straddle either the morning or the afternoon rush hour period.

Schedule haft-shifts with fewer packets that it can serve first. These are the least versatile, and the quickest to schedule since the candidate schedules will be fewer.

Schedule vans first, since ambulatory trips on the waitlist can go to NDSP's while wheelchair trips cannot.

Schedule lowest cost provider first, or schedule larger capacity vehicles first, and so on.

The scheduling engine of the disclosed technology then determines possible root packets for the selected subset of the partial vehicle shifts. A root packet is a packet that contains a possible first stop on a route schedule. In one embodiment, such a packet must be within a predetermined distance from a garage as well as possibly meeting other ride criteria. In one embodiment, the additional constraints to be a root packet are:

The deadhead miles from the garage of Half-Shift-Y to the $1^{st}$ stop of the candidate packet must be less than a maximum value MAX_PULLOUT_MILES (a site parameter to prevent too-long pullout deadhead miles—while legal, this is wasteful scheduling).

If the arrival time from the garage is before the start of the promised pick time window of the $1^{st}$ stop of the candidate packet, then the wait time is calculated as (start of the promised pick time window—arrival time). The wait time must be less than a maximum value MAX_PULLOUT_WAIT_MINUTES (a site parameter to prevent waiting unproductively too long before being able to pick up the client in the promised pick time window—while technically legal, this is wasteful scheduling).

In one embodiment, the following representative industry values for these constraints are used. Of course, these can be personalized to site-specific values:

MAX_PULLOUT_MILES 10.0 miles

MAX_PULLOUT_WAIT_MINUTES 30 minutes

The root packets define the first set of trip requests of a candidate schedule. As shown in FIG. 5, partial shift 1 has four possible root packets (P1, P6, P26 and P124) that could be the first packet serviced on the partial shift. Partial shift 2 has four possible root packets (P1, P21, P38 and P240) that could be the first packet serviced by partial shift 2 and so on. Each root packet becomes the root of a tree of packets defining possible candidate schedules for the partial shift. As will be explained below, candidate schedules starting with each possible root packet are determined for each partial shift in the set of partial shifts being scheduled. For example, if there are 20 wheelchair vehicle partial shifts to be scheduled first, possible root packets are determined for each of the 20 wheelchair partial shifts and candidate schedules starting with each possible root packet are determined using the packet to packet compatibility matrix 300 and the packet to route compatibility matrix 400.

Candidate Schedule Generator

In one embodiment, a candidate schedule generator that is part of the scheduling engine is implemented as a recursive function that is applied to a root packet of a partial-shift, to generate all possible schedules starting with that root packet. Beginning with the root packet, the generator searches within the packet to route compatibility matrix 400 and the packet-can-link-to-packet matrix 300 for all Packets X that can be used to extend the incomplete schedule from that root packet node. The schedule generator function creates a child node for each such packet X and generates a recursive call for that child node, and so on. The terminating condition for recursion is if there are no packets that it can link to extend the schedule in the half-shift-can-serve-packet matrix 400 for that half-shift. From a root packet X, one embodiment of the disclosed method uses the "Packet can be served by Half-Shift" matrix 400 to find possible following packets Y that can be assigned to that half-shift. For any possibility, it looks at the "Packet can link Packet" [X][Y] entry. If "=1 or true", then it can extend the search. If "=0 or false", it stops the search from packet X. In this way, the depth of search is limited thereby preventing a combinatorial explosion of the number of candidate schedules that would need to be compared. The branch factor is variable. The following pseudo code shows one example of such a recursive function to generate the possible schedules for a root packet.

PCLTP abbreviation for matrix packet-can-link-to-packet 300
    HSCSP abbreviation for matrix half-shift-can-serve-packet 400
    Generate-Half-Shift-Candidates(Half-Shift-X)
    {For each Root Packet Y in the row of HSCSP for Half-Shift-X
        Put Root Packet Y in position=1 of the array CANDIDATE-SCHEDULE
        Call recursive function Extend(1) to generate all candidate-schedules
    Pick-Best-Candidates(Half-Shift-Subset)
    }
    Extend(Position)
    {Tail=CANDIDATE-SCHEDULE[position]
        if Tail has no Packets it can link to in PCLTP which is also in HSCSP
            Add 1 Candidate-schedule
            return
        For each Packet Z that Tail can link to in PCLTP which is also in HSCSP
            Put Packet Z in position+1 of the array CANDIDATE-SCHEDULE
            Call recursive function Extend(position+1)
    }

There is only 1 possible root packet for each Half-Shift-B, namely the last packet of the corresponding Half-Shift-A. While the starting point of Half-Shift-A is constrained (start of shift, garage location), the end point is only partially constrained (start of break, any location X). Both the starting point of Half-Shift-B (end of break, location X) and the end point (end of Shift, Garage location) are constrained.

Selecting Packets to Apply to Each Partial Shift

Partial shifts selected to be scheduled first will take the most runtime and be the most productively scheduled since the unscheduled packets available decrease monotonically. The two matrices, Packet-can-link-to-Packet 300 and Half-Shift-can-serve-Packet 400, become more and more sparse as packets are scheduled. Note that scheduling the Half-Shift-A for a route must precede scheduling the Half-Shift-B of that route since Half-Shift-A defines the starting point for Haft-Shift-B.

The practical limit of the number N of partial shifts being scheduled at the same time depends on the number of packets, and the stage of scheduling. N can be dynamic, increasing as progress in committing half-shifts is made. When the runtime for the current subset of partial shifts drops lower than a threshold value, N can be increased. The advantage of N>1 is that global consideration during scheduling becomes possible. As an example of a global consideration, half-shifts with fewer candidate schedules are scheduled before those half-shifts with more candidate schedules since many other candidate schedules are eliminated with each commitment (if they share a common packet). Such half-shifts are at greater risk to have all of their candidate schedules eliminated if not given priority. As another example, half-shifts should be assigned candidate schedules with fewer common packets with yet-to-be scheduled half-shifts. Such commitments eliminate fewer candidate schedules, leaving more options for yet-to-be scheduled half-shifts. Once all candidate schedules for the possible root packets are generated for the subset of half-shifts, the next steps are to successively:

1. Pick the "best" half-shift to commit to (e.g. schedule) next
2. Pick the "best" candidate schedule to assign to that half-shift
3. Commit the "best" schedule to the "best" half-shift
4. Eliminate candidate schedules from the other half shifts in the set that are being scheduled that share a packet with the selected "best" candidate schedule
5. Go to Step 1. for the next heuristic cycle Picking the "best" half-shift to commit to next (Le, selecting among a set of candidates) can be based on state of the art methods such as a weighted scoring function or heuristic strategy such as described in U.S. Pat. No. 10,634,502. In one embodiment, the selection is based on a weighted scoring function WSF-1 to select the "best" half-shift, including in order:

1. Number of candidate schedules (COUNT)—favor half-shifts with fewer candidate schedules available, since the set of candidate schedules will only diminish monotonically.
2. Vehicle type (WC)—favor half-shifts with wheelchair capacity, since they can service wheelchair trips which cannot be currently sent to NDSP's.
3. Shift start (SHIFT-START)—favor half-shifts with earlier shift start times. In one embodiment, a weighted score applied to each possible half-shift to be scheduled next includes:
    Its COUNT=count of candidate schedules ($6^{th}$-$9^{th}$ digits). This count is dynamically updated after each cycle.
    A factor for wheel chair seats available such as WC=10−count of wheelchair seats ($5^{th}$ digit).
    Its SHIFT-START=Shift start in minutes from midnight (least sianificant $1^{st}$-$4^{th}$ digits).

In one embodiment, one suitable weighted scoring function is: WSF-1=100000*COUNT+1000*WC+SHIFT-START. The candidate half-shifts are sorted in ascending order (e.g. smallest score to largest score). The half-shift with the lowest weighted score is then selected as the next "best" half-shift to schedule. Since COUNT is updated after each cycle, the weighted scoring function must also be updated after each iteration of scheduling the selected half shift.

Once the next best half-shift to schedule is selected, the candidate schedules determined for the possible root packets for that half-shift are analyzed to select the "best" candidate schedule for that half-shift. In one embodiment, another weighted scoring function WSF-2 is used to select the "best" candidate schedule, including in order:

Number of Packets (PACKETS)—favor higher count of packets as a more efficient schedule.
Number of Trips (TRIPS)—favor higher count of trips as a more efficient schedule.
Deadhead miles (DEADHEAD-MILE)—favor fewer empty deadhead miles connecting packets as a more efficient schedule.

In one embodiment, the weighted scoring function is: WSF-2=1000*PACKETS+100*TRIPS−DEADHEAD-MILE. The candidate schedules are then sorted in descending order (e.g. largest to smallest) and the candidate schedule with the largest score is selected as the "best" candidate schedule for that half-shift.

As will be understood by those skilled in the art, other quality metrics can be added to the weighted scoring function to consider other factors such as idle gaps, pullout miles, wheelchair trip count, service hours, etc.

Once the "best" candidate schedule has been selected, the packets in the candidate schedule are committed to the half shift. The following pseudo code illustrates one embodiment of the logic used to iteratively select the next half shift for scheduling and to select the candidate schedule for that half-shift, until no half-shift is left unscheduled or no candidate schedule is IN.

```
Mark-All-Candidate-Schedules-IN( )
Do
{Select-and-Commit-Candidate-Schedule-to-Half-
    Shift( )
 Update-Candidate-Schedule-Status( )
}
While (Some-Candidate-Schedules-IN)
Select-and-Commit-Candidate-Schedule-to-Half-Shift( )
{Score-and-Sort-Half-Shifts-by-WSF-1( )
   Half-Shift X=Select-Best-Half-Shift( )
   Flag-All-Candidate-Schedules-For-Half-Shift(Half-
       Shift X)
     Score-and-Sort-Flagged-Candidate-Schedules-by-
         WSF-2( )
     Candidate-Schedule-Y=Select-Best-Candidate-
         Schedule( )
     Mark-Candidate-Schedule-Packets-SCHEDUL-
         ED( )
}
Update-Candidate-Schedule-Status( )
{Mark-Rest-of-Flagged-Candidate-Schedules-for-Half-
    Shift-X-OUT( )
 For All Candidate Schedules Marked IN
 {Test-If-Candidate-Schedule-Contains-Packets-
     Marked-SCHEDULED( )
   If-Yes-Mark-Candidate-Schedule-OUT( )
 }
}
```

The advantage of scheduling a subset of half-shifts with membership N>1 is that the selection of the Half-Shift X and the selection of candidate Schedule Y to commit to Haft-Shift X can be made sensitive to Global Consequences. The next half-shift selected may be the one with the fewest candidate schedules still available (since the count of candidate schedules monotonically decreases). The candidate schedule selected may be the one that makes obsolete the fewest candidate schedules available to unscheduled half-shifts remaining in the subset.

As will be appreciated, it can be noted that as the various half-shifts are scheduled, the packet-can-link-to-packet matrix 300 becomes more and more sparse, as cells that reference packets that are committed are set to 0 or otherwise indicated as being unavailable. By being scheduled, they are no longer available to be considered in scheduling subsequent haft-shifts. In addition, the half-shift-can-serve-packet matrix 400 becomes more and more sparse for the same reason. Commitment reduces root packets & branching factors for all subsequent half-shifts, so the count of candidate schedules per half-shift diminishes. Thus, the new method becomes faster and faster with each successive subset of half-shifts that is scheduled.

To complete the routes, the second partial shifts (e.g. half-shift-B's) need to be selected. This is an easier process since there can be only one possible root packet for each half-shift-B i.e. the packet with the last drop location at the end of the corresponding half-shift-A. Possible schedules are determined using this root packet. The possible candidate schedules are scored and the "best" candidate schedule is selected in accordance with the score. Once packets are committed to a half-route B, they are marked as unavailable in the packet-to-packet compatibility matrix 300 and the process continues for the remaining half-shift-B's.

Appendix A shows a sample output for scheduling 3 half-shifts (HS300, HS400, HS500) in which there are 8037 candidate schedules generated. In the example shown, the subset of vehicle route half-shifts is a subset of N=3 routes with the same half-shifts (from [7:00, 11:00]) and the same vehicle type (with seating capacity [2 Ambulatory, 5 Wheelchair]).

In this example, since the half-shifts all begin at the same time, with the same vehicle capacity, the best schedule for one can apply to any of the three half-shifts. In the example shown, out of the 123 packets determined, there are 17 possible root nodes for the half shifts. Note that any 3 of these schedules could have been generated by a constructive approach for the 3 Half-Shifts, since the 8037 candidate schedules represent the space of all possible solutions within the real-world Para-transit constraints. By packeting the trips to reduce the combinatorial explosiveness and by scheduling partial shifts to prevent the packet tree from becoming too deep such that the number of candidate schedules explodes, the present technology enables possible candidate schedules to be analyzed with one or more quality metrics in order to pick a "best" candidate schedule. By picking the best candidate schedule among all candidate schedules for set of partial shifts being scheduled, instead of constructing a single schedule for an entire shift, the number and position of unused gaps, the balance of work, and the amount of deadhead travel times and deadhead travel miles can all become considerations and part of the decision-making process in deciding which candidate schedules to commit to which vehicle route half-shifts.

Note that the weighted scores for the 8037 possible candidate schedules shown in the Appendix varied from 20442 to 91077 with a median score of 60630. The 3 candidate schedules selected (candidate schedule #'s 4883, 6649 and 461) to commit to the 3 half-shifts had scores of 91077, 70798, and 61032. All were above the median score illustrating how the disclosed technology can select routes that better meet quality metrics than can be obtained using the prior art methods mentioned above.

Figure 6:
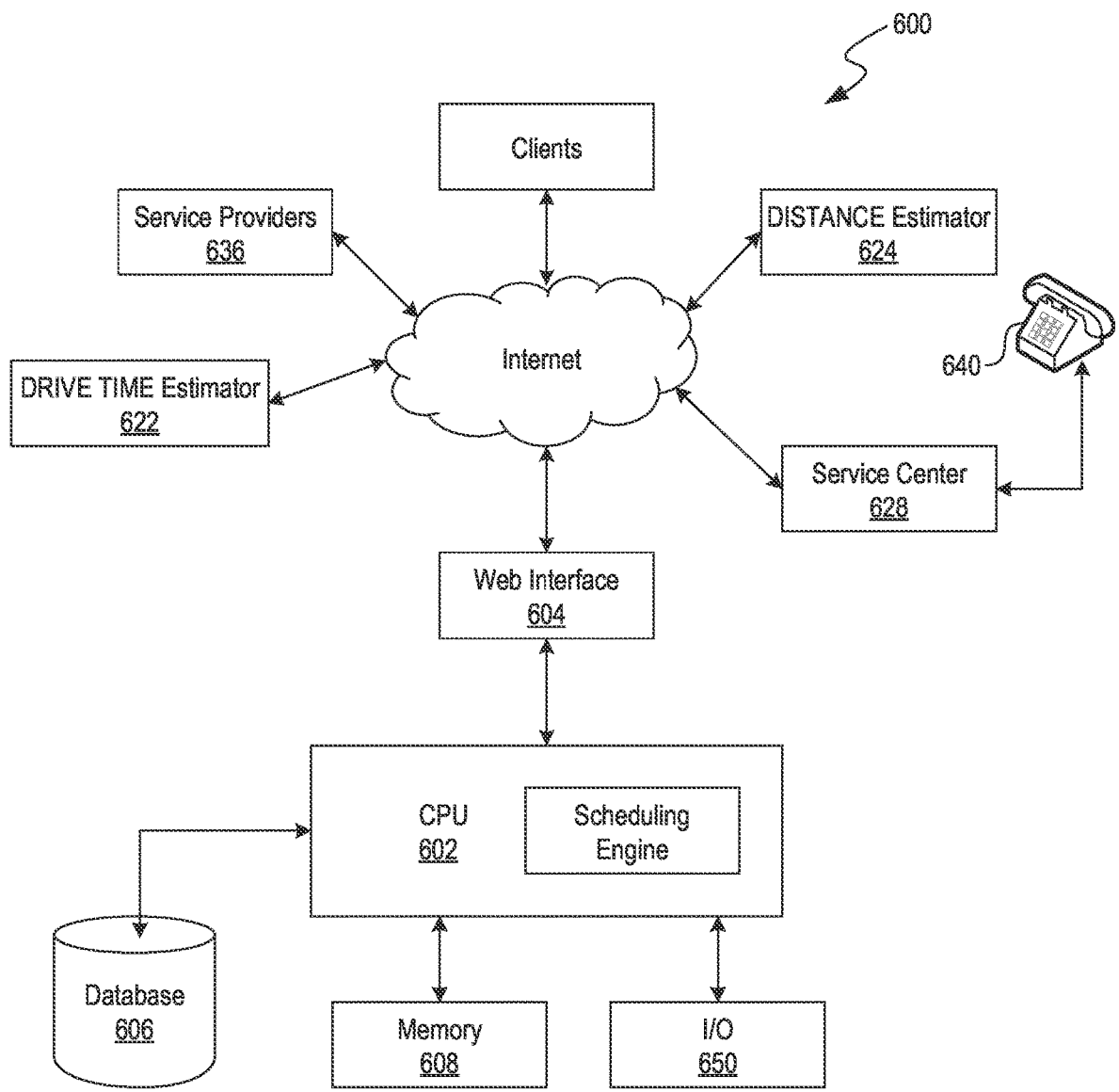
FIG. 6 illustrates a representative computing system with which the disclosed technology can be implemented.

FIG. 6 illustrates a representative computing system 600 that can be used to determine vehicle routes in accordance with the disclosed technology. The computer system 600 includes a processor 602 that which can be a CPU, graphics processor card, DSP or other programmable device that can execute programmed instructions stored on a non-transitory computer readable media (e.g. hard drive, flash drive, CD-ROM, programmed memory etc.) to implement a scheduling engine as described. The processor 602 is connected to a global communication network, such as the internet, through a network interface and communication circuitry 604. The processor 602 can also communicate via the internet to external services 622, 624 to predict travel times between geographic locations given differing traffic conditions and to calculate the distance between locations. Using the web interface, clients can request their desired trips via the internet, which are stored in a database in a memory 606 of the computer system. Alliteratively, the processor 602 can receive trip request data from a service center 628 that clients can call to place their trip requests. Service providers 636 can also provide data to the processor 602 about their available fleets and can receive the computed schedules for the partial vehicle shifts via the web interface 604.

Computing system 600 also includes memory 608 that can be used to store the data structures about which packets can link to each other and about which packets can be assigned to which partial routes as well as site specific parameters used in the quality metrics used for ranking possible schedules etc. Finally, the computing system 600 includes input/output devices (keyboard, mouse, video monitors etc.) to allow operators to use the computer system to calculate routes for the partial shifts from the list of requested trips.

From the foregoing, it will be appreciated that specific embodiments of the invention have been described herein for purposes of illustration, but that various modifications may be made without deviating from the scope of the disclosed technology. For example, the disclosed embodiment of the technology determines schedules for half shifts but other partial shifts could be used. For example, a shift might drive longer distances from 8-11 am, be centered around a known location (hospital, community center etc.) from 12-2 and then drive longer distances for clients from 2-5 p.m. In this case, three partial routes could be scheduled individually instead of trying to schedule the entire route at one time without the ability to compare how possible route solutions compare with quality metrics.

I claim:

1. A computer-implemented method of assigning trip requests to vehicle routes, comprising:
   storing a number of trip requests in a memory of a computer system;
   combining trip requests into packets of one or more trip requests that can be serviced by a single vehicle while meeting one or more ride criteria and storing records of the packets in the memory;
   storing a record of which packets can be linked to one another while meeting one or more service constraints in the memory;
   storing a record for a number of partial shifts indicating which packets can be serviced by which partial shifts while meeting one or more constraints in the memory;
   selecting a number of partial shifts for vehicle routes to schedule and for each of the partial shifts:
      determining one or more root packets that contain a first possible stop on a route schedule for a partial shift in accordance with one or more constraints;
   starting with each root packet, recursively searching the records of which packets can be linked to one another and which packets can be serviced by which partial shifts until there are no packets that can be linked to extend a candidate schedule in the record of which packets can be serviced by which partial shifts to generate all possible candidate schedules in order to limit the depth of the search and prevent combinatorial explosion;
   computing a score for each of the candidate schedules; and
   computing a score for each of the number of partial shifts to be scheduled and based on the score of the partial shifts, selecting one of the number of partial shifts to schedule and based on the scores of the candidate schedules for the selected partial shift, selecting a candidate schedule to the selected partial shift.

2. The method of claim 1, further comprising eliminating any candidate schedules from the remaining number of candidate schedules that share a packet with the packets of the selected candidate schedule.

3. The method of claim 2, further comprising: scheduling a number of second partial shifts that have a corresponding first partial shift that has been scheduled by selecting as a root packet for the second partial shifts, the last packet in the schedule for the corresponding first partial shifts and recursively searching the records of which packets can follow one another and which packets can be serviced by which partial shifts to determine all possible candidate schedules for the second partial shifts starting with the selected root packets.

4. The method of claim 3, further comprising: computing a score for the candidate schedules for the second partial shifts, computing scores for the second partial shifts and selecting a second partial shift to schedule based on the scores and selecting a candidate schedule for the selected second partial shift based on the scores of the candidate schedules.

5. The method of claim 1, further comprising: transmitting the scheduled partial shifts to a vehicle operator to implement.

6. A computer system for scheduling trip requests onto routes of vehicles comprising:
   a memory that stores a number of computer executable instructions;
   a processor that is configured to execute the instructions to:
      store data for a number of trip requests;
      combine data for trip requests into packets representing one or more trip requests that can be serviced by single vehicle while meeting one or more ride criteria;
      store a record of which packets can follow one another on a route schedule while meeting one or more service constraints in the memory;
      store a record for a number of partial shifts indicating which packets can be serviced by which partial shifts while meeting one or more constraints in the memory;
      selecting a number of partial shifts to schedule;
      for each partial shift to schedule:
         determining one or more root packets that contain a first possible stop on a route schedule for the partial shift in accordance with one or more constraints;
         beginning with each root packet, recursively searching the records of which packets can follow one another and which packets can be serviced by which partial shifts until there are no packets that can be linked to extend a candidate schedule in the record of which packets can be serviced by which partial shifts to determine all possible candidate schedules for the partial shift in order to limit the depth of the search and prevent combinatorial explosion;
         calculating a score for each of the candidate schedules in accordance with one or more performance criteria;
      selecting a partial shift from the number of partial shifts to be scheduled and selecting a candidate schedule for the selected partial shift based on the score of the selected candidate schedule;
      committing the packets of the selected candidate schedule to the partial shift in order to create a schedule of trip requests for the selected partial shift;
      marking the packets of the selected candidate schedule as unavailable in the record of which packets can follow one another; and marking the packets of the selected candidate schedule as unavailable in the record of which packets can be serviced by which partial shifts.

7. The computer system of claim 6, further comprising instructions that when executed cause the processor to compute a score for the number of partial shifts and selecting a partial shift to schedule based on the scores.

8. The computer system of claim 6, further comprising instructions that when executed cause the processor to select a number of second partial shifts to schedule and selecting a last packet of a corresponding first partial shift that has been scheduled as a root packet for each of the second partial shifts.

9. The computer system of claim 8, further comprising instructions that when executed cause the processor to recursively search the records of which packets can follow one another and which packets can be serviced by which partial shifts beginning with the root packets of the second partial shifts to determine all possible candidate schedules for the second partial shifts, compute a score for the number of second partial shifts and select a second partial shift to schedule based on the score.

10. The computer system of claim 9, further comprising instructions that when executed cause the processor to compute a score for the candidate schedules and select a candidate schedule for the second partial shift to be scheduled based on the scores of the candidate schedules.

* * * * *